June 24, 1930.    A. MOORHOUSE    1,766,926
MOTOR VEHICLE
Filed March 12, 1928
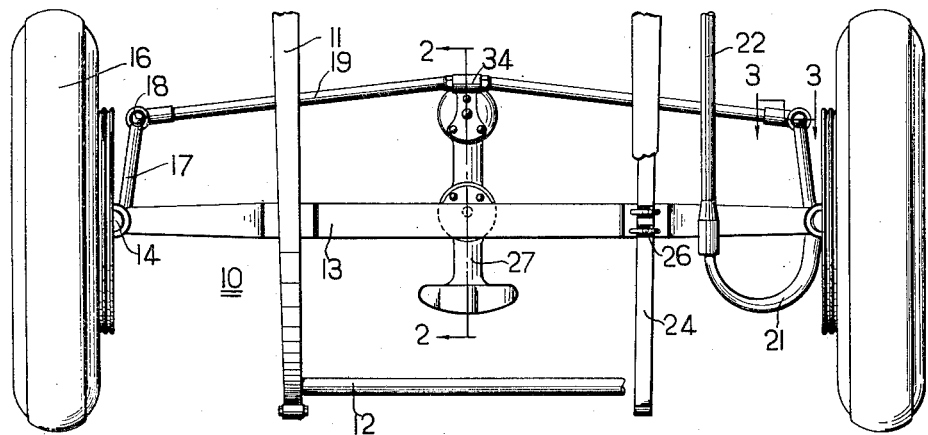
F I G _ I
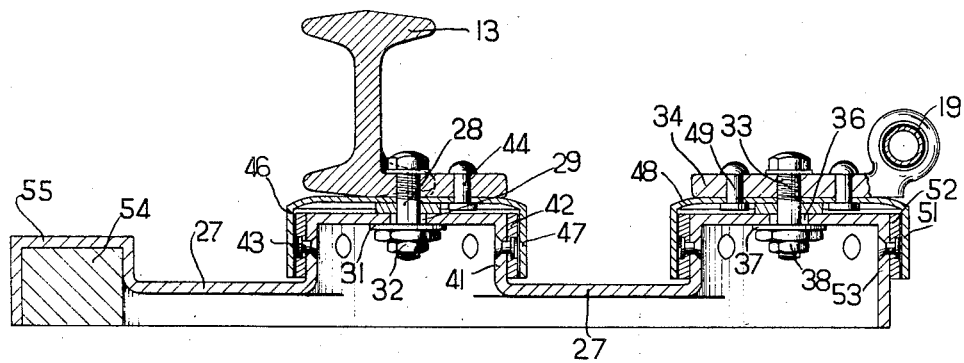
F I G _ 2
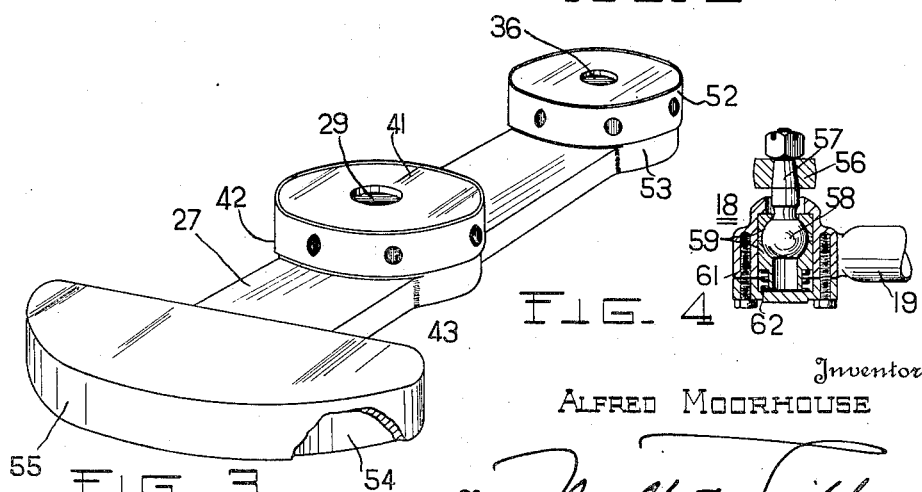
F I G _ 3    F I G _ 4
Inventor
ALFRED MOORHOUSE
By Nelson Tibbetts
Attorney Patented June 24, 1930

1,766,926

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 12, 1928. Serial No. 260,907.

This invention relates to motor vehicles and particularly to the steering apparatus thereof, and it has for its principal object to provide apparatus by means of which rapid oscillatory vibration of the front or steering wheels of the vehicle about their steering axes may be eliminated.

In modern motor vehicles, particularly those equipped with large low-pressure tires of the balloon type, it frequently happens that at certain speeds of the vehicle a rapid oscillation of the front wheels on their pivotal mountings is set up, taking the form of an oscillatory vibration of considerable amplitude, which is destructive to the various parts of the vehicle, is exceedingly uncomfortable, and which increases the difficulty of steering to a point at which operation of the vehicle is quite dangerous. This phenomenon has come to be known in the art as "shimmy" and it will be hereafter so referred to in this specification.

The disturbance is frequently accompanied by an alternate periodic deflection of the front vehicle springs, causing the axle to vibrate in the vetrical plane of its length, which motion may acquire such an amplitude as to alternately lift the steering wheels clear of the ground, and may assume such proportions at certain road speeds of the vehicle as to cause it to shake violently preventing proper steering, and producing the other ill effects above noted.

Another object of this invention is to provide a simple and efficient device to frictionally damp steering wheel shimmy, which device shall not in any way interfere with the normal operation of the steering mechanism in controlling the vehicle.

A further object of the invention is to provide a damping device of this character in which the damping means is ineffective to resist normal movements of the steering wheels, but is automatically shifted into operative relation to resist movement thereof upon the beginning of a violent vibration of said wheels.

Other objects of the invention will appear from the following description taken in connection with the drawings, which form a part of this specification, and in which:

Fig. 1 is a plan view of a portion of the chassis of a motor vehicle, partly broken away, showing the front axle and steering mechanism thereof equipped with the present invention;

Fig. 2 is a view in section through the front axle shown in Fig. 1, taken substantially on the line 2—2 of Fig. 1;

Fig. 3 is a detail view in perspective of part of the device, including the lever and integral brake members, and Fig. 4 is a detailed view showing the construction of the tie rod steering connection taken substantially on the line 4—4 of Fig. 1.

In the drawing, 10 represents the forward portion of the chassis of a motor vehicle having the usual side frame members 11 connected by suitable cross frame members, such as 12. At 13 is shown the front axle of the vehicle, provided at its ends with suitable steering knuckles 14 on which the front vehicle or steering wheels 16 are rotatably mounted in the usual manner. Each of the steering knuckles 14 has a rearwardly disposed steering arm 17, adapted for pivotal connection through a ball and socket connection as at 18 to a steering tie rod 19, and one of the steering knuckles is also provided with a steering arm 21 by means of which it is connected to a drag link 22, adapted for operation by the vehicle steering gear (not shown) in a manner well understood in the art to which this invention relates The vehicle axle 13 is connected to the side frame members 11 in the usual manner by springs 24 which are disposed beneath the frame members, these springs being clamped to the axle by means of clip bolts 26, and connected at each end to the frame members in any suitable way.

The damping means of this invention is preferably mounted on the front axle 13 substantially at the center thereof. It comprises a lever member 27, as shown in Figs. 2 and 3, which may be conveniently formed as a stamping, and which is connected at a point intermediate its ends to the axle 13. As shown, this connection is a vertically disposed pivot bolt 28 secured to the bottom flange of the axle 13, and passing through a hole 29 in the lever member 27. The hole 29 is somewhat larger in diameter than the bolt 28, which is provided with a washer 31 and nuts 32, so that member 27 is supported from the axle 13. Thus the lever is capable of a pivotal movement about the bolt 28, and also of limited translatory movement in a horizontal plane, permitted by the clearance between the hole 29 and the bolt.

At the rear end of the lever 27 there is a similar connection to the tie rod 19, comprising a pivot bolt 33 secured to a fixture or clamp 34, which is rigidly fixed on the tie rod, the bolt 33 passing through a hole 36 of larger diameter in the lever 27, near the rear end thereof. The bolt 33 is similarly provided with a washer 37 and retaining nuts 38.

The lever 27 is formed adjacent its middle portion with a cylindrical raised portion forming a brake member 41, which is concentric with the hole 29, this hole being formed in the upper face thereof. This cylindrical brake member 41 is preferably provided on its outer face with suitable friction material 42, such as the well-known brake lining, which is rigidly secured thereto as by rivets 43 in the well-known manner.

Rigidly secured to the axle 13 as by rivets 44 is a friction member or drum 46 of somewhat larger diameter than the brake member 41, and having a downwardly disposed peripheral flange portion 47 adapted to surround the brake member 41 and its friction lining 42. This friction member 46 is preferably concentric with the pivot bolt 28, and it will be apparent that by reason of the clearance provided by the hole 29, the brake member 41 may move to some extent within the friction member 46 without bringing the friction lining 42 into effective braking engagement with the flange 47 of the friction member 46.

A similar friction member 48 is rigidly secured to the clamping fixture 34 on the tie rod 19, as by means of rivets 49. This friction member 48 has a downwardly disposed peripheral flange 51 which is cooperable with friction lining 52 on a cylindrical brake member 53, similar to the brake member 41, which is provided with a concentric hole 36. It will be evident that when the tie rod 19 is moved relatively to the axle in steering the vehicle, the lever 27 will be moved about the pivot bolt 28, and that such movement may consist of an oscillation about the bolt 28, and a motion of translation in a horizontal plane within the friction flange 47. It will also be evident that the rear brake member 53 makes a similar movement within the flange of the rear friction member 48.

The other end of the lever 27 constitutes an inertia device, being provided with a suitable weight or inertia member 54, and formed as at 55 to rigidly secure this member. It is the purpose of this weight to so shift the lever 27 as to bring the respective pairs of brake and friction members into operative engagement upon an oscillatory disturbance of any considerable magnitude.

Thus it will be evident that during normal steering of the vehicle, the motion of the tie rod is relatively slow, so that the inertia of the member 54 will have no appreciable effect on the lever 27. This permits the brake members 41 and 52 to move within their respective friction housings or drums 46 and 48 without any considerable amount of radial pressure, and therefore without effective braking. Such resistance as may result from the light pressures which may occur does not add any noticeable resistance to the vehicle steering, or increase the burden thereof.

However, upon the commencement of a shimmy in the vehicle wheels 16 the tie rod 19 because of its connection thereto will be given a violent oscillatory movement. This is communicated to the lever 27 through its connection to the tie rod, and causes a rapid oscillatory movement of the lever 27. However, the weight member 54, by reason of its inertia, is unable to easily follow the rapid movements of this forced vibration of the lever, so that a force of considerable magnitude is exerted on the lever 27 in the horizontal plane thereof. This tends to move the lever bodily so as to take up the lateral clearance between the brake member 41 and the friction flange 47, and also between the brake member 53 and the friction flange 51. The friction linings 42 and 52 are thus urged into effective braking engagement with the flanges 47 and 51 respectively, so that there is exerted on the lever 27 a friction braking force of considerable magnitude which resists the oscillatory movement of the lever and the connected tie rod and wheels, and dissipates energy from the vibratory steering system at a rate sufficient to prevent the resonant growth thereof.

The difference in the paths of movement of the rear end of the lever 27 and the tie rod clamp 34, as the steering wheels are turned from one extreme position to the other, may be permitted by the clearance between the brake members 41 and 52, and their respective friction drums 46 and 48, which permits some of the fore and aft movement of the lever 27. However, the differences in these motions are preferably further compensated by the construction and mounting of the tie rod 19, which as clearly shown in Fig. 1 is bent at or adjacent the mid-portion, thus forming a cranked structure which is capable of a swinging movement about the line of centers through the ends of the steering arms 17. Such swinging movement is permitted by the ball and socket connection between the steering arms 17 and the rod 19, as clearly shown in Fig. 4. The rear end of the steering arm 17 is provided with an eye 56 in which is rigidly mounted a stud 57 terminating in a ball 58. A two-part socket containing the cooperating ball abutments 59 is mounted in a suitable housing 61 which is clamped or otherwise rigidly secured to the end of the tie rod 19. The abutments 59 engage the ball 58 in the well known manner, being urged into coaction therewith by a suitable spring 62. It will thus be apparent that the rod 19 may swing to some extent in a vertical plane about the respective bolt connections 58 so that ample compensation for the differences in movement above mentioned, is provided.

From the above description it will be evident that this invention provides a simple and efficient damping means for the vibratory disturbance known as shimmy, automatically operable upon the inception of the disturbance to dissipate the energy thereof, which device does not increase the labor of steering the vehicle in any way. It will be furthermore seen that this device may be easily and inexpensively manufactured, as by a stamping process from sheet metal.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. The combination with a motor vehicle having pivoted steering wheels, of a brake member connected to and movable with said wheels, a friction member cooperable with said brake member and normally out of braking relation therewith and an inertia device operable upon oscillatory vibration of the steering wheels to establish such braking relation.

2. The combination with a motor vehicle having an axle and steering wheels pivotally mounted thereon, of a brake member pivotally mounted on said axle and connected to the wheels to turn therewith, a friction member mounted on said axle and out of effective braking engagement with the brake member during normal steering movements of the wheels, and an inertia device operable to bring said brake and friction members into effective braking engagement upon oscillatory vibration of the steering wheels about their pivots.

3. The combination with a motor vehicle having an axle and steering wheels pivotally mounted thereon, of a brake member pivotally mounted on said axle and connected to the wheels to turn therewith, a friction member mounted on said axle and out of effective braking engagement with the brake member during normal steering movement of the wheels, and an inertia device connected to the brake member and operable upon abnormal oscillation of the steering wheels to move said member into braking engagement with the friction member.

4. The combination with a motor vehicle having an axle with steering wheels pivotally supported thereon and a steering tie rod connecting said wheels for oscillation in unison about their steering pivots, of a lever pivotally mounted on said axle having one end connected to the tie rod, a braking device on said lever, and a weight member on the other end of the lever.

5. The combination with a motor vehicle having an axle and steering gear including a movable rod, of a lever fulcrumed on the axle and connected at one end to said rod, a weight member secured to the other end of the lever, and friction devices associated with the fulcrum and the connection operable in response to the inertia of said weight member to resist movement of said lever.

6. The combination with a motor vehicle having a steering gear including a movable member, of a lever fulcrumed on the vehicle and connected at one end to said member to move therewith, a brake device adapted to frictionally resist movement of said lever, and an inertia member on said lever operable to actuate the brake device upon rapid oscillation of the movable member.

7. The combination with a motor vehicle having a steering gear including a movable member, of a damping device comprising a lever member having raised cylindrical portions, lost motion connections between said portions and the vehicle and member respectively, friction members adapted to contact said portion at the limits of the lost motion, and a weight member secured to the lever.

8. A device for damping rapid oscillatory movements in the steering gear of a motor vehicle comprising a lever mounted on the vehicle and connected to said steering gear to move therewith, a friction device associated with the lever mounting to resist movement of said lever, and inertia means carried by and operable on the lever to increase the resistance of said device upon rapid oscillatory movement of the steering gear.

9. A device for damping oscillatory movements in the steering gear of a motor vehicle comprising a friction drum on the vehicle, a lever loosely fulcrumed concentric with the drum and connected at one end to the steering gear, a brake member on the lever within the drum having radial clearance therewith, and inertia means on the lever operable in response to rapid oscillation to take up the clearance and to bring the brake and drum into operative contact.

In testimony whereof I affix my signature.

ALFRED MOORHOUSE.